(12) United States Patent
Iwasaki et al.

(10) Patent No.: US 6,364,049 B1
(45) Date of Patent: Apr. 2, 2002

(54) ELECTRIC POWERING STEERING APPARATUS

(75) Inventors: Akira Iwasaki; Takayuki Hashimoto; Masanobu Miyazaki; Shinichi Tokura, all of Tochigi (JP)

(73) Assignee: Showa Corporation (JP)

( * ) Notice: Subject to any disclaimer, the term of this patent is extended or adjusted under 35 U.S.C. 154(b) by 0 days.

(21) Appl. No.: 09/670,524

(22) Filed: Sep. 26, 2000

(30) Foreign Application Priority Data

Jan. 13, 2000 (JP) ........................................ 2000-004966

(51) Int. Cl.[7] ................................................. B62D 5/04
(52) U.S. Cl. ........................................ 180/444; 384/526
(58) Field of Search ................................. 180/443, 444, 180/445, 446; 384/526

(56) References Cited

U.S. PATENT DOCUMENTS

| | | | |
|---|---|---|---|
| 1,117,943 A | * | 11/1914 | Dilg ............................ 384/526 |
| 4,720,197 A | * | 1/1988 | Scharting et al. ............ 384/526 |
| 6,044,723 A | * | 4/2000 | Eda et al. ................ 74/388 PS |

FOREIGN PATENT DOCUMENTS

| | | | |
|---|---|---|---|
| JP | 639665 | 5/1994 | ............. B62D/5/04 |
| JP | 1143062 | 2/1999 | ............. B62D/5/04 |
| JP | 1117102 | 6/1999 | ............. B62D/5/04 |

* cited by examiner

*Primary Examiner*—Anne Marie Boehler
(74) *Attorney, Agent, or Firm*—Orum & Roth

(57) ABSTRACT

In an electric power steering apparatus, a bearing of a drive shaft provided with a worm gear is connected to the drive shaft in an axial direction. It installs an elastic body (a holding device) which elastically deforms so as to move the drive shaft in an axial direction at a time of load input when tooth faces of the worm gear and the worm wheel are brought into contact with each other.

4 Claims, 5 Drawing Sheets

ELECTRIC POWERING STEERING APPARATUS

BACKGROUND OF THE INVENTION

1. Field of the Invention

The present invention relates to an electric power steering apparatus.

2. Description of the Related Art

An electric power steering apparatus is structured such that a pinion shaft connected to a steering shaft is engaged with a rack shaft. A worm gear is provided in a drive shaft connected to a steering assist motor. A worm wheel engaged with the worm gear is connected to the pinion shaft, whereby torque of a motor is transmitted to the rack shaft so as to assist steering operation.

In this case, on respective tooth faces of the worm gear and the worm wheel, a proper backlash is set in view of the particular requirement for working and operating. However, in the electric power steering apparatus, there is a case that the power transmitting direction is reversed due to operation of a steering wheel or vibration input from a road surface. In the reverse drive mentioned above, a tooth face at the back of the tooth face with which the worm gear or the worm wheel has been brought into contact suddenly moves at a degree of the backlash and collides with the opposing tooth face, whereby a striking sound is generated.

In the prior art as described in Japanese Patent Application Laid-Open Publication No. 11-171027, in order to reduce the striking sound as mentioned above, the structure is made such that a bush is provided in a bearing for supporting a drive shaft provided with a worm gear to a gear housing and an elastic body is interposed between the drive shaft and the bearing, whereby the drive shaft of the worm gear can be moved in an axial direction and an impact force generated on the tooth faces of the worm gear can be reduced by a bending deformation of the elastic body.

However, the structure of reducing the striking sound due to the reverse drive in the conventional electric power steering apparatus is made such that the bush is provided in the bearing and the elastic body is interposed between the drive shaft and the bearing. Therefore, the number of parts is increased and the number of steps for assembly is also increased.

SUMMARY OF THE INVENTION

An object of the present invention is to reduce the striking sound generated by a reverse drive by a simple structure in an electric power steering apparatus.

In accordance with the present invention, there is provided an electric power steering apparatus comprising:

a pinion shaft connected to a steering shaft being engaged with a rack shaft;

a bearing with an inner wheel and an outer wheel rotatably supporting a drive shaft connected to a steering assist motor, the drive shaft provided with a drive gear; and an intermediate gear engaged with the drive gear, the intermediate gear being connected to the pinion shaft, wherein the bearing of the drive shaft is connected to the drive shaft in an axial direction, and an elastic body is located between the inner and outer wheel. The elastic body elastically deforming at a load input time when respective tooth surfaces of the drive shaft and the intermediate gear are brought into contact with each other so as to move the drive shaft in an axial direction.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings

FIGS. 4A and 4B show a bearing, in which FIG. 4A is a cross sectional view showing a state at a time of no load and FIG. 4B is a cross sectional view showing a state at a time of inputting a load;

FIGS. 7A and 7B show the holding device, in which FIG. 7A is a developed view showing a state at a time of no load and FIG. 7B is a developed view showing a state at a time of inputting a load.

DESCRIPTION OF THE PREFERRED EMBODIMENTS

Figure 1:
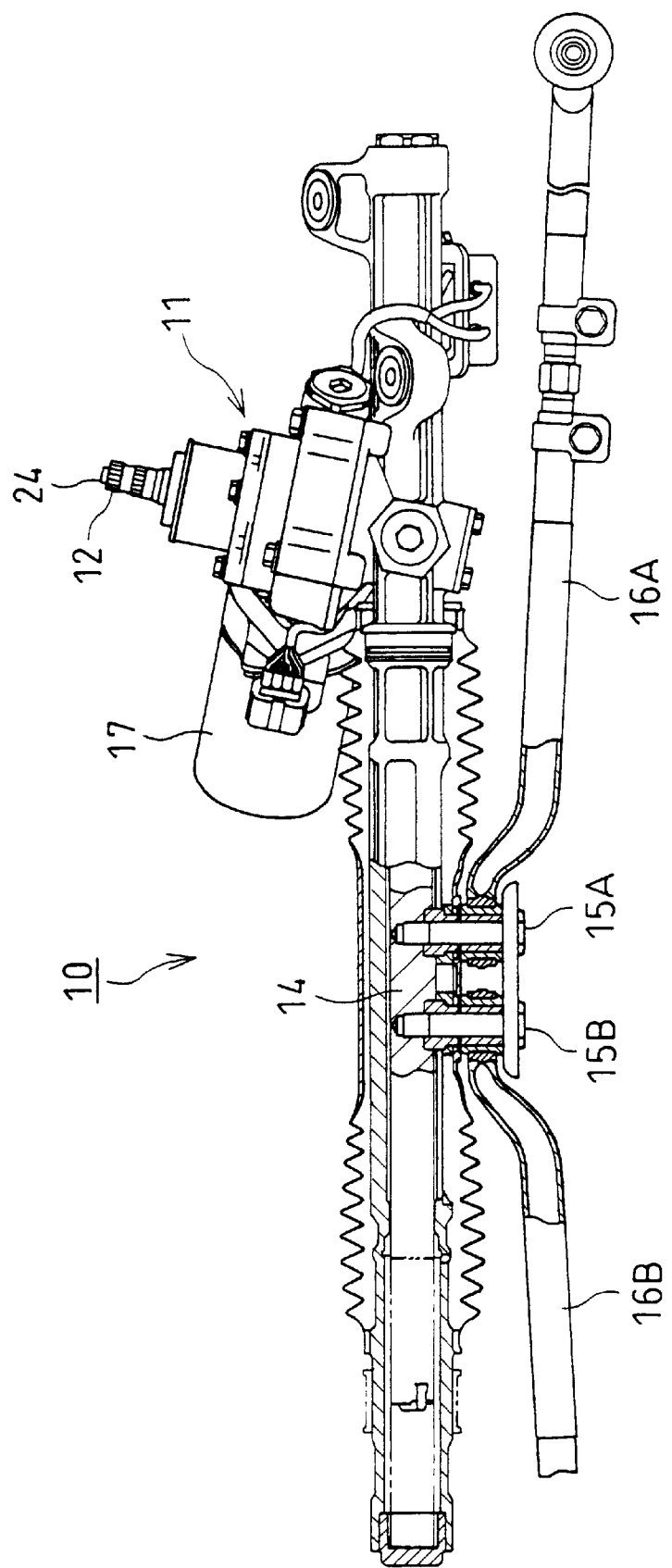
FIG. 1 is a schematic view showing an electric power steering apparatus.
Figure 2:
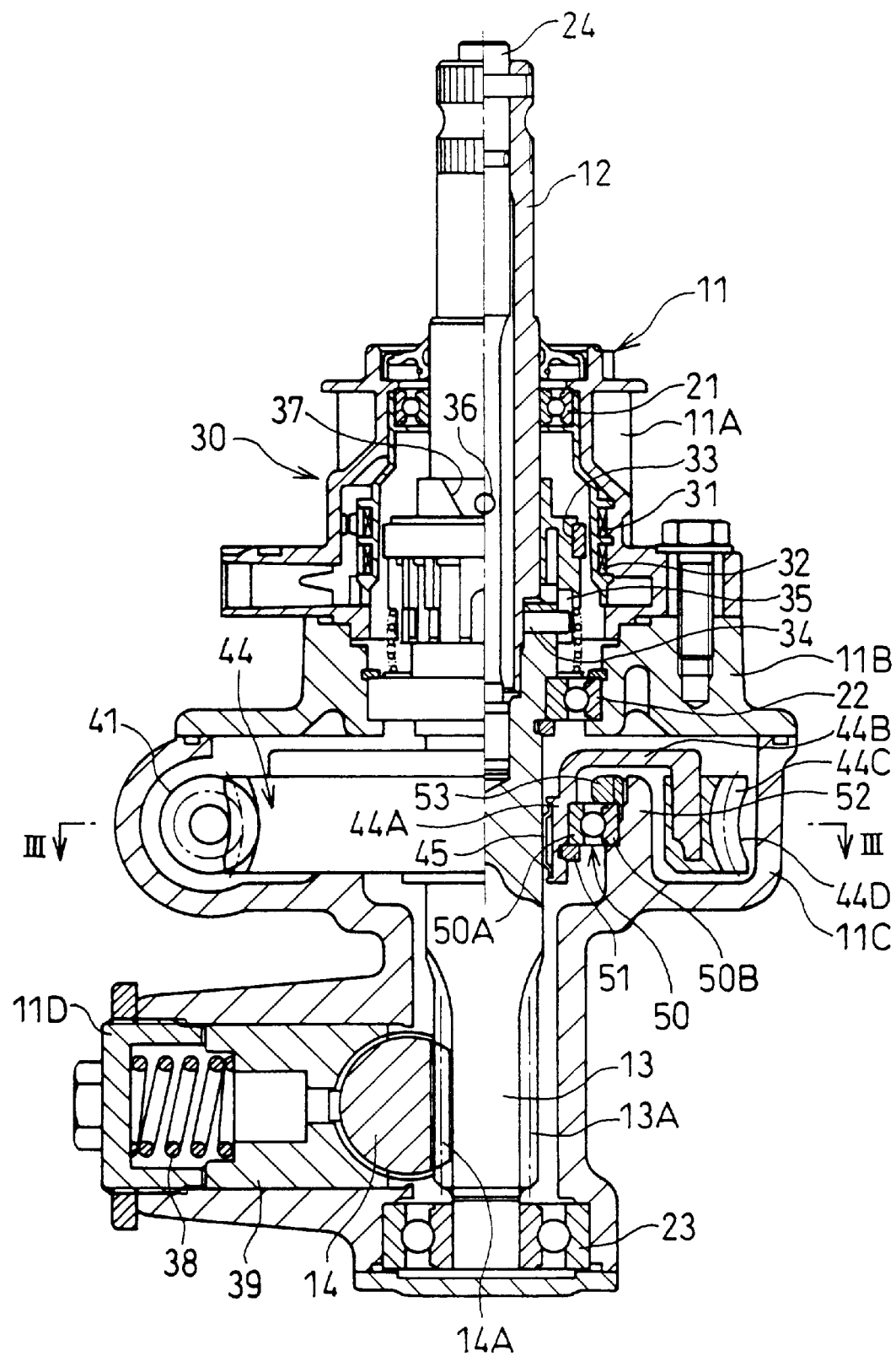
FIG. 2 is a vertical cross sectional view showing the electric power steering apparatus.
Figure 3:
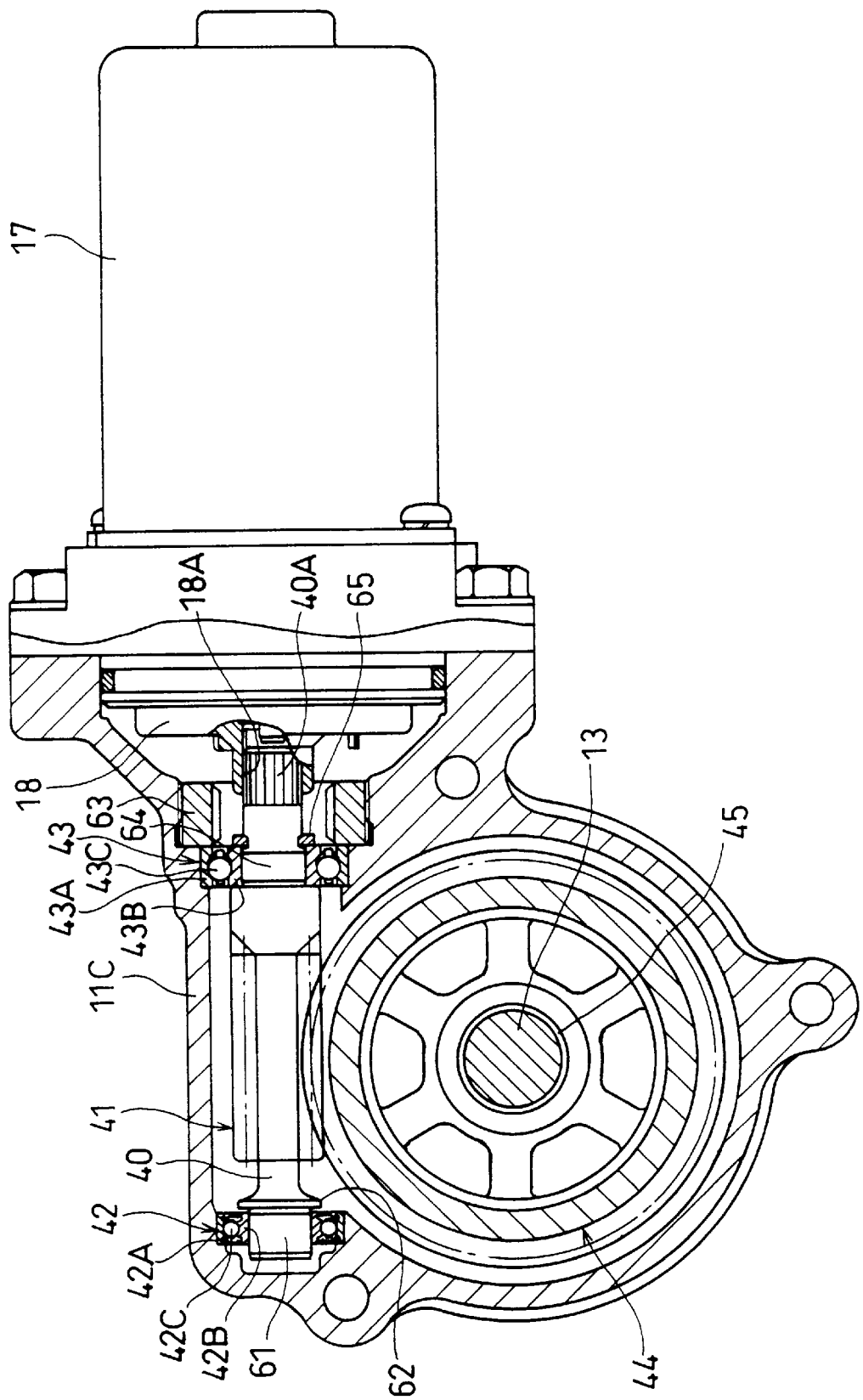
FIG. 3 is a cross sectional view along a line III—III in FIG. 2.

An electric power steering apparatus 10 is structured, as shown in FIGS. 1 to 3, such that a steering shaft 12 to which a steering wheel is connected is connected to a pinion shaft 13 in an inner portion of a gear box 11. The pinion shaft 13 is engaged with a rack shaft 14, and left and right tie rods 16A and 16B are connected to a middle portion of the rack shaft 14 via connection bolts 15A and 15B, whereby a steering force of the steering wheel applied by a driver is assisted by a steering assist motor 17 fixed to the gear box 11.

The gear box 11 is, as shown in FIG. 2, constituted by first to third gear housings 11A to 11C, supports the steering shaft 12 and the pinion shaft 13 by bearings 21, 22 and 23, and connects the steering shaft 12 to the pinion shaft 13 therein by a torsion bar 24.

The gear box 11 is provided with two detecting coils 31 and 32 constituting a torque sensor 30 in the first housing 1 1A in such a manner as to surround a cylindrical core 33 engaged with the steering shaft 12 and the pinion shaft 13. The core 33 is provided with a vertical groove 35 engaging with a guide pin 34 of the pinion shaft 13, is structured such that the core 33 can be moved only in an axial direction. It is provided with a spiral groove 37 engaging with a slider pin 36 of the steering shaft 12. Accordingly, when a steering torque applied to the steering wheel is applied to the steering shaft 12 and a relative displacement in a rotational direction is generated between the steering shaft 12 and the pinion shaft 13 due to an elastic torsional deformation of the torsion bar 24. The displacement in the rotational direction of the steering shaft 12 and the pinion shaft 13 causes to displace the core 33 in an axial direction, so that an inductance of the detecting coils 31 and 32 due to a magnetic change in the periphery of the detecting coils 31 and 32 generated by the displacement of the core 33 is changed. That is, when the core 33 moves to a side of the steering shaft 12, an inductance of the detecting coil 31 disposed in a side to which the core 33 moves close is increased. An inductance of the detecting coil 32 disposed in a side from which the core 33 moves apart is reduced, whereby it is possible to detect the steering torque due to the change of the inductance.

The gear box 11 engages rack teeth 14A of the rack shaft 14 with pinion teeth 13A in an end portion in an opposite side of the torque sensor 30 of the pinion shaft 13. At this time, a cap 11D is fixed to a third gear housing 11C, and a rack guide 39 backed up to the cap 11D via a spring 38 supports a back surface of the rack shaft 14.

The gear box 11 supports the motor 17 to the third gear housing 11C, supports a drive shaft 40 connected to an output shaft of the motor 17 via a clutch 18 to the third gear housing 11C at both ends by bearings 42 and 43 in the manner mentioned below. It is integrally provided with a worm gear 41 (a drive gear) in a middle portion held between the bearings 42 and 43 of the drive shaft 40, as shown in FIG. 3.

Accordingly, the gear box 11 coaxially connects the worm wheel 44 (an intermediate gear) engaged with the worm gear 41 to the middle portion of the pinion shaft 13 via a torque limiter 45 so as to support to the third gear housing 11C by a bearing 50 as mentioned below. The torque limiter 45 is constituted by an elastic ring such as a spring or the like, and pressure inserted to a portion between the pinion shaft 13 and a boss 44A of the worm wheel 44 so as to be elastically held in a diametrical direction. Accordingly, the torque limiter 45 continuously connects the worm wheel 44 to the pinion shaft 13 without sliding due to the elastic force of the elastic ring at a normally used torque (a torque smaller than the limit torque) of the electric power steering apparatus 10. In the case that a stroke of the rack shaft 14 is suddenly stopped because a tire rides over a curbstone during a steering operation or other reasons, whereby a force of inertia of the motor 17 applies a great impact force to the worm wheel 44, there generates an impact torque over the elastic force of the elastic ring (a limit torque), the torque limiter 45 functions to slip the worm wheel 44 against the pinion shaft 13 so as not to transmit the torque of the motor 17.

The worm wheel 44 is constituted by a boss 44A, an arm 44B and a rim 44C. Teeth 44D are provided in the rim 44C, the boss 44A. The arm 44B are constituted by an insert metal fitting so as to secure a strength, and the rim 44C is constituted by a resin so as to intend to reduce an engaging sound with the worm gear 41.

The bearing 50 is structured such that an inner wheel 50A is attached to the boss 44A of the worm wheel 44 so as to be held by a stop wheel 51. An outer wheel 50B is attached to an annular support portion 52 of the third gear housing 11C so as to be held by a nut 53. Thus, the bearing 50 supports the worm wheel 44 to the gear box 11 in such a manner as to freely rotate in a state of being independent from the pinion shaft 13. Accordingly, the bearing 50 is provided at a position (the same position in an axial direction) corresponding to an engaging position (a position of the teeth 44D) between the worm wheel 44 and the worm gear 41, in an axial direction of the worm wheel 44. In this case, the worm wheel 44 attaches the outer wheel 50B of the bearing 50 to the annular support portion 52 of the third gear housing 11C in order to hold the inner wheel 50A of the bearing 50 in the boss 44A and engages the nut 53 with the annular support portion 52 from an opening of the arm 44B, thereby being assembled in the gear box 11.

Accordingly, a detailed description will be given below of a structure of supporting the drive shaft 40 provided with the worm gear 41 to the third gear housing 11C. The drive shaft 40 is structured such that a spline shaft portion 40A is engaged with and inserted to a spline hole 18A provided in a rotor of the clutch 18. It supports both end portions of the worm gear 41 to the third gear housing 11C by the bearings 42 and 43 as mentioned above.

The bearing 42 has an outer wheel 42A pressure inserted to the third gear housing 11C and an inner wheel 42B attached to the drive shaft 40. It radially supports a one end supporting portion 61 of the drive shaft 40 by interposing a transfer body 42 between the outer wheel 42A and the inner wheel 42B, and makes the drive shaft 40 to freely move in an axial direction. In this case, a flange 62 provided in one side of the one end supporting portion 61 of the drive shaft 40 is collided with the inner wheel 42B of the bearing 42 when the drive shaft 40 excessively moves in the axial direction, thereby restricting the excessive movement.

Figure 4A:
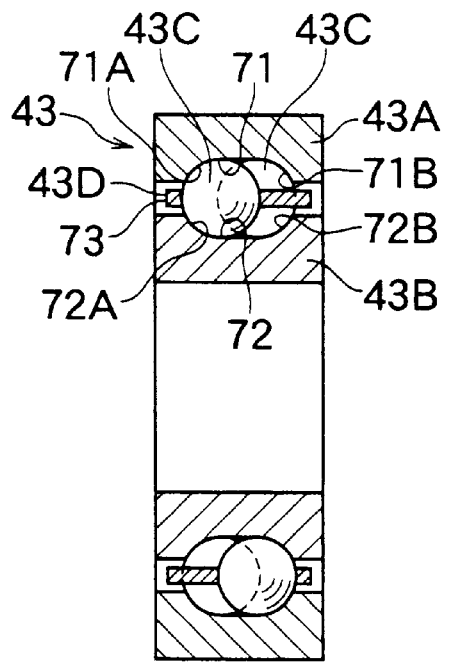
Figure 4B:
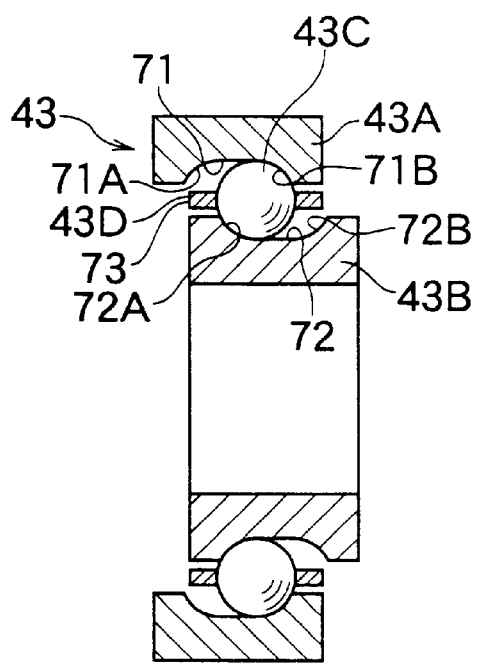
Figure 5:
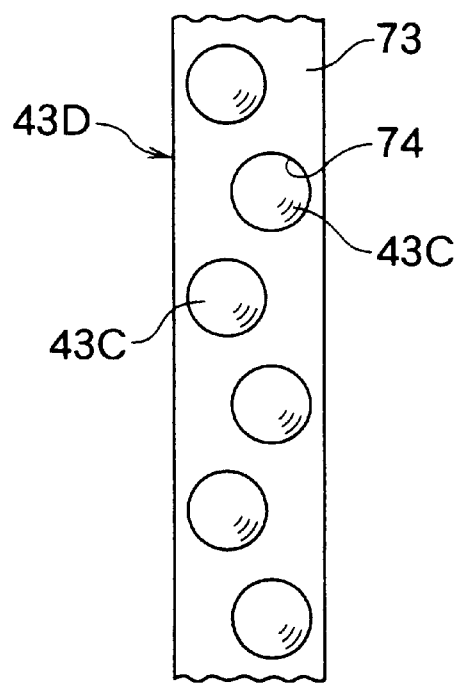
FIG. 5 is a developed view showing a holding device.

The bearing 43 is structured, as shown in FIGS. 4A and 4B, to have an outer wheel 43A fixed to the third gear housing 11C by a nut 63 engaged with the third gear housing 11C. It has an inner wheel 43B fixed to an intermediate support portion 64 of the drive shaft 40 which is held between an end surface of the worm gear 41 and a stopper wheel 65, and transfer bodies 43C constituted by a multiplicity of balls and rollers interposed between wide transfer surfaces 71 and 72 of the outer wheel 43A and the inner wheel 43B. It also has an annular holding device 43D for holding each of the transfer bodies 43C. The holding device 43D is constituted by a band-like elastic body 73 such as a rubber, a spring material or the like which elastically deforms in a direction of a width of the band plate as shown in FIG. 5, and is provided with holding holes 74 for arranging the adjacent transfer bodies 43C in a zigzag manner in a peripheral direction. Further, the holding device 43D holds the respective transfer bodies 43C in the holding holes 74 to bring part of the transfer bodies 43C into sliding contact with thrust receiving surfaces 71A and 72A on one side of both wide transfer surfaces 71 and 72 of the outer wheel 43A and the inner wheel 43B, and to bring the other transfer bodies 43C into sliding contact with thrust receiving surfaces 71B and 72B in another side of both wide transfer surface 71 and 72 of the outer wheel 43A and the inner wheel and the inner wheel 43B, at a time of no load shown in FIG. 4A. Accordingly, the bearing 43 is connected to the drive shaft 40 in the axial direction, and elastically deforms the elastic body 73 (the holding device 43D) in the direction of the width of the band plate so as to move the adjacent transfer bodies 43C in one line in the peripheral direction. Therefore making it possible to move the drive shaft 40 in the axial direction, at a time of inputting the load as shown in FIG. 4B at which the tooth faces of the worm gear 41 and the worm wheel 44 are brought into contact with each other at a time of reverse driving the electric power steering apparatus 10.

That is, in the electric power steering apparatus 10, in accordance with a control unit (not shown) which obatains detecting results of a vehicle speed sensor (not shown) adn the torque sensor 30 mentioned above, a dirve current pof the motor 17 is determined from a predetermined assist force map and a torque of the motor 17 corresponding to a proper steering assist force in response to the vehicle speed and the steering torque is applied to the pinion shaft 13. In this case, the clutch 18 provided between the motor 17 and the worm gear 41 shuts the steering assist force when assistance is not required at high speeds.

In accordance with the present embodiment, the following effects can be obtained.

(1) When the worm gear 41 and the worm wheel 44 bring the tooth faces into contact with each other due to an existence of the backlash thereof at a time of reverse driving the electric power steering apparatus 10, the bearing 43 of the drive shaft 40 provided with the worm gear 41 can move the drive shaft 40 in the axial direction in accordance with the elastic deformation of the elastic body 73 installed in the bearing 43, softens the impact force generated on the tooth faces of the worm gear 41 by the elastic bending deformation of the elastic body 73, and reduces the striking sound between the tooth faces.

(2) In accordance with a simple structure in which the elastic body 73 is installed in the bearing 43, it is possible to easily realize the item (1) mentioned above without increasing the number of the parts and the number of the assembling steps.

(3) In accordance with a significantly simple structure of the bearing 43 in which the inherently required holding device 43D is formed only by the elastic body 73 for holding the transfer body 43C interposed between the wide transfer surfaces 71 and 72 of the outer wheel 43A and the inner wheel 43B, it is possible to realize the item (1) mentioned above.

Figure 6:
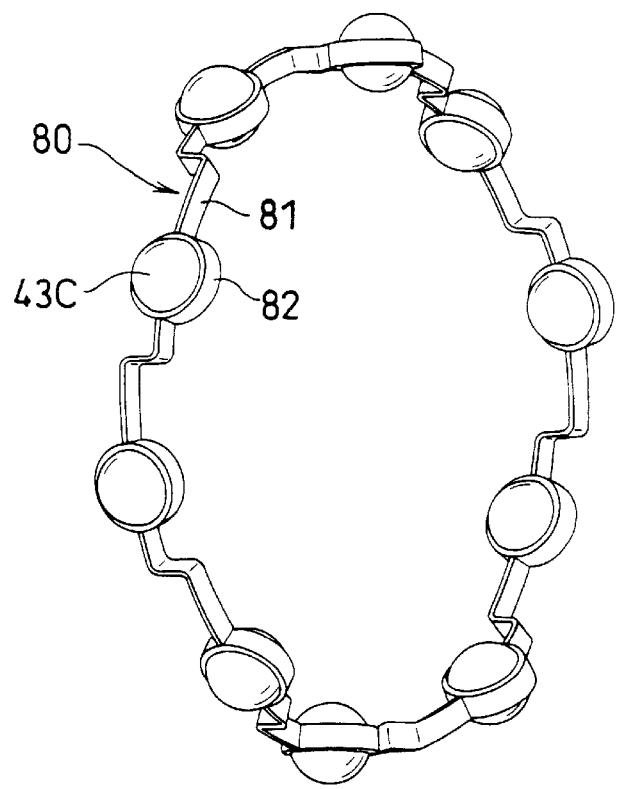
FIG. 6 is a perspective view showing a modified embodiment of a holding device.
Figure 7A:
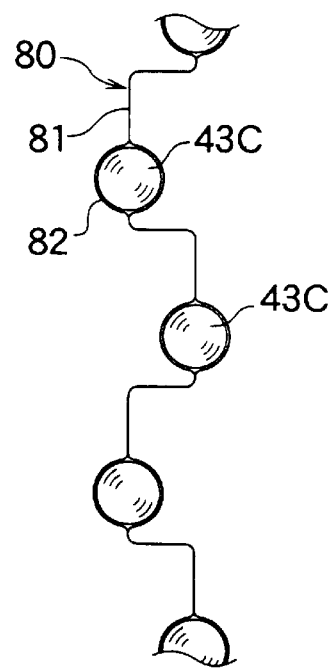
Figure 7B:
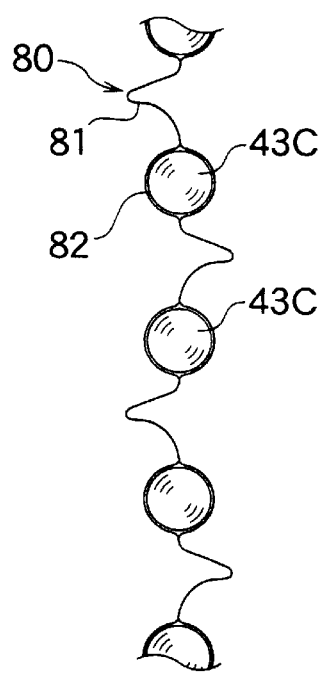

FIG. 6 is a holding device 80 in accordance with a modified embodiment of the holding device 43D (the elastic body 73) constituting the bearing 43 in FIGS. 4A and 4B. The holding device 80 is constituted by a bent plate-like elastic body 81 such as a rubber, a spring material or the like which elastically deformed in an axial direction. It is provided with holding wheels 82 for arranging the adjacent transfer bodies 43C in a zigzag manner in a peripheral direction. Further, the holding device 43D holds the respective transfer bodies 43C in the holding wheels 82 to bring a part of the transfer bodies 43C into sliding contact with the thrust receiving surfaces 71A and 72A in one side of both wide transfer surfaces 71 and 72 of the outer wheel 43A. The inner wheel 43B and bring the other transfer bodies 43C into sliding contact with thrust receiving surfaces 71B and 72B in another side of both wide transfer surface 71 and 72 of the outer wheel 43A and the inner wheel 43B, at a time of no load shown in FIG. 7A. Further, the bearing 43 elastically deforms the elastic body 81 (the holding device 80) in the axial direction thereof so as to move the drive shaft 40 in the axial direction, at a time of inputting the load as shown in FIG. 7B.

As heretofore explained, embodiments of the present invention have been described in detail with reference to the drawings. However, the specific configurations of the present invention are not limited to the embodiments but those having a modification of the design within the range of the present invention are also included in the present invention.

As mentioned above, in accordance with the present invention, in the electric power steering apparatus, it is possible to reduce the striking sound due to the inverse drive by the simple structure.

Although the invention has been illustrated and described with respect to several exemplary embodiments thereof, it should be understood by those skilled in the art that the foregoing and various other changes, omissions and additions may be made to the present invention without departing from the spirit and scope thereof Therefore, the present invention should not be understood as limited to the specific embodiment set out above, but should be understood to include all possible embodiments which can be embodied within a scope encompassed and equivalents thereof with respect to the features set out in the appended claims.

What is claimed is:

1. An electric power steering apparatus comprising:

a pinion shaft connected to a steering shaft being engaged with a rack shaft;

a bearing with an inner wheel and an outer wheel rotatably supporting a drive shaft connected to a steering assist motor, said drive shaft provided with a drive gear; and an intermediate gear engaged with said drive gear, said intermediate gear being connected to said pinion shaft, wherein said bearing of the drive shaft is connected to said drive shaft in an axial direction; said bearing having an elastic body located between the inner and outer wheels which elastically deforms at a load input time when respective tooth surfaces of the drive shaft and the intermediate gear are brought into contact with each other so as to move said drive shaft in an axial direction.

2. An electric power steering apparatus comprising:

a pinion shaft connected to a steering shaft being engaged with a rack shaft;

a bearing rotatably supporting a drive shaft connected to a steering assist motor, said drive shaft provided with a drive gear; and an intermediate gear engaged with said drive gear, said intermediate gear being connected to said pinion shaft, wherein said bearing of the drive shaft is connected to said drive shaft in an axial direction; and installs an elastic body which elastically deforms at a load input time when respective tooth surfaces of the drive shaft and the intermediate gear are brought into contact with each other so as to move said drive shaft in an axial direction;

the bearing of said drive shaft having an outer wheel fixed to a gear housing, an inner wheel fixed to the drive shaft, a multiplicity of transfer bodies interposed between wide transfer surfaces of the outer wheel and the inner wheel, and an annular holding device for holding each of the transfer bodies, and wherein said holding device comprises said elastic body being arranged and constructed to hold each of the transfer bodies in such a manner as to bring a part of the transfer bodies into sliding contact with a thrust receiving surface in one side of both transfer surfaces of the outer wheel and the inner wheel and bring the other transfer bodies into sliding contact with a thrust receiving surface in another side of both transfer surfaces of the outer wheel and the inner wheel, at a time of no load.

3. An electric power steering apparatus as claimed in claim 2, wherein said holding device is constituted by an elastic body which elastically deforms in a direction of a width of a band plate, and is provided with holding holes for arranging the adjacent transfer bodies in a zigzag manner in a peripheral direction in the elastic body.

4. An electric power steering apparatus as claimed in claim 2, wherein said holding device comprises a bent elastic body which elastically deforms in an axial direction, and is provided with holding wheels for arranging the adjacent transfer bodies in a zigzag manner in a peripheral direction in the bent elastic body.

* * * * *